United States Patent
Blunden et al.

(10) Patent No.: US 6,372,360 B1
(45) Date of Patent: Apr. 16, 2002

(54) FIRE RETARDANT TREATMENT

(75) Inventors: Stephen John Blunden, Beaconsfield; Paul Andrew Cusack, Iver Heath; Anthony James Wallace, High Wycombe, all of (GB)

(73) Assignee: ITRI Ltd., Middlesex (GB)

( * ) Notice: Subject to any disclaimer, the term of this patent is extended or adjusted under 35 U.S.C. 154(b) by 0 days.

(21) Appl. No.: 09/180,117

(22) PCT Filed: Apr. 16, 1997

(86) PCT No.: PCT/GB97/01059

§ 371 Date: Apr. 5, 1999

§ 102(e) Date: Apr. 5, 1999

(87) PCT Pub. No.: WO97/41303

PCT Pub. Date: Nov. 6, 1997

(30) Foreign Application Priority Data

May 1, 1996 (GB) .............................................. 9609083
Jun. 21, 1996 (GB) .............................................. 9613073

(51) Int. Cl.[7] ......................... B32B 29/00; D21H 17/63; C09D 5/16; C09K 21/02; B05D 3/02
(52) U.S. Cl. .................... 428/532; 428/537.5; 162/159; 162/181.4; 106/18.13; 106/18.26; 252/601; 252/607; 427/372.2
(58) Field of Search .............................. 428/532, 537.5, 428/537.7; 162/135, 159, 181.1, 181.2, 181.4, 181.5; 106/18.13, 18.26; 252/601, 607, 608; 427/372.2

(56) References Cited

U.S. PATENT DOCUMENTS

| 4,079,036 A | * | 3/1978 | Ohmori et al. ...... 260/45.75 D |
| 4,146,669 A | | 3/1979 | Dikler .......................... 428/328 |
| 4,514,327 A | * | 4/1985 | Rock .......................... 252/607 |
| 5,093,199 A | | 3/1992 | Hoechst ....................... 428/403 |

FOREIGN PATENT DOCUMENTS

| DE | 1769688 | 6/1968 |
| EP | A-0156196 | 10/1985 |
| EP | 0 333 506 | 9/1989 |
| EP | 0459552 A1 | 12/1991 |
| EP | A-0630950 | 12/1994 |
| FR | 321 063 | 12/1902 |
| GB | 546620 | 7/1942 |
| GB | 696975 | 9/1953 |
| GB | A-2134094 | 8/1984 |
| GB | 2218422 A | 11/1989 |
| JP | 60199069 | 10/1908 |
| JP | 51-145560 | * 12/1976 |
| JP | 9-302521 | * 11/1997 |
| WO | WO 97/00909 | 1/1997 |
| WO | WO 97/41303 | 11/1997 |

OTHER PUBLICATIONS

*Flame Retardant Polymeric Materials*, edited by M. Lewin, S.M. Atlas and E.M. Pearce, Plenum Press, pp. 82–84, New York 1975. No Month.
*The Industrial Uses of Tin Chemicals*, S.J. Blunden, P.A. Cusack and R. Hill, Royal Society of Chemistry, pp. 180 and 182, 1985. No Month.
Derwent Publications Ltd., London, GB; AN 88–094943; XP002013603 & JP,A,63 045 123 (Ishihara Sangyo Kaisha) Feb. 26, 1988.
Derwent Publications Ltd., London, GB; AN 87–104169; XP002013604 & JP,A,62 050 334 (Sumitomo Bakelite KK, Seiko Kasei KK) Mar. 5, 1987.

* cited by examiner

*Primary Examiner*—D. S. Nakarani
*Assistant Examiner*—Holly C. Rickman
(74) *Attorney, Agent, or Firm*—Wolf, Greenfield & Sacks, P.C.

(57) ABSTRACT

Fire retardant cellulosic material comprises from 0.4 to 2.0% by weight of tin and from 0.4 to 8.0% by weight of boron based on the weight of the cellulosic material. The fire retardant material is prepared in a two-stage or a one-stage process. The two-stage process comprises impregnation of the material with an alkaline solution of an alkali metal stannate or stannite, followed by impregnation with an aqueous solution of boric acid and drying. The one-stage process comprises impregnation of the material with a stable aqueous colloidal suspension of hydrous tin oxide stabilized with an alkali metal salt of boric acid having a pH in the range of from 4 to 8, followed by drying.

18 Claims, No Drawings

FIRE RETARDANT TREATMENT

The present invention relates to a method of treating cellulosic materials, such as paper or board, in order to improve the fire resistant properties thereof.

Fire retardant treatments for cellulosic materials are well known and are described, for example, in Flame Retardant Polymeric Materials, Edited by M. Lewin, S. M. Atlas and E. M. Pearce, Plenum Press, New York 1975. The main chemicals which are described for use in such treatments are diammonium and monoammonium phosphate, zinc chloride, ammonium sulphate, borax and boric acid, and ammonium chloride. Additionally, alkali metals stannates have also been reported in The Industrial Uses of Tin Chemicals, S. J. Blunden, P. A. Cusack and R. Hill, Royal Society of Chemistry, 1985, but have not been particularly effective.

The present invention is based upon the discovery that the combined use of alkali metal stannates or stannites and boric acid forms a synergistic fire retardant combination when impregnated into cellulosic materials. Hence, it is found that the use of an alkali metal stannate or stannite in combination with boric acid provides an increased fire-retardant effect, which is considerably greater than that which would be expected from the use of either the alkali metal stannate or stannite, or boric acid alone.

Accordingly, the present invention provides a process for the fire retardant treatment of cellulosic materials, which comprises the steps of:
(a)(i) impregnating the cellulosic material with an alkaline solution of an alkali metal stannate or stannite;
(a)(ii) further impregnating the cellulosic material with an aqueous solution of boric acid; or
(b) impregnating the cellulosic material with a stable aqueous colloidal suspension of hydrous tin oxide, stabilized with an alkali metal salt of boric acid, having a pH in the range of from 4 to 8; and
(c) allowing the impregnated material to dry.

For the two stage treatment detailed above, in the first impregnation step two basic varieties of treatment liquid are used in accordance with the invention, namely (i) aqueous solutions of alkali metal stannates, such as sodium or potassium stannate ($Na_2Sn(OH)_6$ or $K_2Sn(OH)_6$); and (ii) aqueous solutions of alkali metal stannites, such as sodium or potassium stannite ($NaSn(OH)_3$ or $KSn(OH)_3$). Each of the liquids should be alkaline, preferably having a pH in the range of from 12 to 14, more preferably in the range of from 13 to 13.5. In a preferred embodiment the invention employs a treatment solution having a higher rather than a lower concentration of free hydroxyl ions. Additionally, the treatment liquid used in the first stage impregnation suitably contains tin (calculated as the metal) in an amount of from 0.01M to 1.25M, preferably 0.04 to 0.4M.

For the second impregnation step in the two stage process, the treatment liquid used in accordance with the invention is an aqueous solution of boric acid containing boron (calculated as the element) in an amount from 0.1M to 3.5M, preferably 1.5M to 2.5M. It is generally necessary for the boric acid treatment solution to be used at an elevated temperature in the range of from 30° C. to 100° C., preferably in the range of from 50 to 85° C.

In the one stage treatment process of the invention, the stable aqueous colloidal suspension of hydrous tin oxide, stabilized with an alkali metal salt of boric acid together with free boric acid (in an ionised or partially ionised form), having a pH in the range of from 4 to 8, preferably in the range of from 5 to 7, may be prepared by reacting an aqueous solution of an alkali metal hydroxystannate with boric acid, until the pH of the solution is in the range of from 4 to 8.

In particular, the aqueous colloidal suspension may be prepared by the following routes:
(a) addition of boric acid to an aqueous solution of the alkali metal stannate, which is ideally at elevated temperature, typically 65–85° C., with continuous stirring;
(b) addition of the alkali metal stannate to an aqueous solution of boric acid, which is ideally at elevated temperature, typically 65–85° C., with continuous stirring, or
(c) mixing the alkali metal stannate and boric acid together in water, at elevated temperature, typically 65° to 85° C., with continuous stirring, in a ratio such that the end colloidal suspension will be in the correct pH range.

In all cases, the tin (IV) species initially precipitates as α-stannic acid, but on prolonged stirring peptisation occurs and a clear colloid results.

The amount of boric acid used will depend upon the initial strength of the alkali metal stannate. The concentration of the alkali metal stannate will generally be in the range of from 0.01 to 0.25M, preferably from 0.1 to 0.2M and the equivalent concentration of boric acid will generally be in the range of from 0.1 to 3.5M, preferably from 1.0 to 3.0M.

The cellulosic material which is treated in accordance with the present invention may be in web form, such as paper, card or cardboard, or in the form of pulp. In the case of cellulosic materials such as paper, card or cardboard, in the two stage process impregnation is most conveniently effected by simply immersing or dipping the material in the treatment solutions, or spraying the treatment solutions, for a period of time sufficient to give the required uptake of each treatment liquid. In the one stage process the web is contacted with the colloidal suspension as defined above by any suitable technique such as immersion, dipping or spraying. In the case of pulp, the pulp is treated by the addition of the treatment solutions in two stages, or by the addition of the colloidal suspension as defined above for the one stage process. The treatment of the pulp will generally be carried out during a routine paper making stage. The treated web, or a web formed from the pulp is then dried so as to form a fire retardant in the body of the cellulosic material.

As noted above, the treatment of cellulosic material in accordance with the invention provides a product having much improved fire resistance properties compared to those obtained from treatment with either of the treating liquids alone.

The cellulosic material is preferably treated in accordance with the present invention to give a final tin content, after drying, in the range of from 0.4 to 12.0% by weight more preferably from 1.0 to 5.0% by weight, based on the weight of the cellulosic material, and a final boron content after drying, in the range of from 0.4 to 8.0% by weight, more preferably from 1.0 to 4.0%, based on the weight of the cellulosic material.

The present invention will be further described with reference to the following Examples.

EXAMPLES 1 to 9

Samples of a waste based liner paper, having an average weight of 186 grams per square metre, were immersed in the treating solutions as described below:
a) An aqueous solution, at 50° C., containing either 0.1M, 0.2M or 0.3M sodium stannate together with an equivalent molarity of sodium hydroxide, for 15 seconds. Following immersion the papers were blotted to remove excess surface moisture and then dried.

b) An aqueous solution, at 80° C., containing either 1.5M, 2.0M or 2.5M boric acid for 15 seconds. Following the immersion the papers were blotted to remove excess surface moisture and then dried.

c) Treatment (a) followed by treatment (b).

The fire retardant properties were assessed using cone calorimetry at an incident heat flux of 70 kW/m$^2$. Five sheets of paper (10 cm×10 cm) were layered together for each test measurement. Fire performance was evaluated using the following parameters.

a) Time to ignition (seconds)

b) Peak rate of heat release (kW/m$^2$)

c) Fire performance index (m$^2$ seconds/kW).

The results of the cone calorimetric evaluation are presented in the following Table 1 and are the average of three individual determinations.

TABLE 1

| Example No | Treatment | Peak Heat Release Rate (kWm$^{-2}$) | Time to ignition | Fire Performance index(m$^2$skW$^{-1}$) |
|---|---|---|---|---|
| Control 1 | Untreated | 172 | 6 | 0.03 |
| Control 2 | Sodium stannate (0.1M) | 167 | 6 | 0.04 |
| Control 3 | Sodium Stannate (0.2M) | 153 | 2 | 0.01 |
| Control 4 | Sodium stannate (0.3M) | 101 | 3 | 0.03 |
| Control 5 | Boric acid (1.5M) | 126 | 8 | 0.06 |
| Control 6 | Boric acid (2.0M) | 134 | 8 | 0.06 |
| Control 7 | Boric acid (2.5M) | 88 | 8 | 0.09 |
| Example 1 | Sodium Stannate (0.1M) + boric acid (1.5M) | 67 | 32 | 0.48 |
| Example 2 | Sodium Stannate (0.1M) + boric acid (2.0M) | 58 | 48 | 0.83 |
| Example 3 | Sodium Stannate (0.1M) + boric acid (2.5M) | 50 | 62 | 1.24 |
| Example 4 | Sodium Stannate (0.2M) + boric acid (1.5M) | 52 | 42 | 0.81 |
| Example 5 | Sodium Stannate (0.2M) + boric acid (2.0M) | 47 | 54 | 1.15 |
| Example 6 | Sodium Stannate (0.2M) + boric acid (2.5M) | 43 | 63 | 1.47 |
| Example 7 | Sodium Stannate (0.3M) + boric acid (1.5M) | 43 | 50 | 1.16 |
| Example 8 | Sodium Stannate (0.3M) + boric acid (2.0M) | 39 | 57 | 1.46 |
| Example 9 | Sodium Stannate (0.3M) + boric acid (2.5M) | 37 | 64 | 1.73 |

EXAMPLE 10

A colloidal suspension of hydrous tin (IV) oxide was prepared by adding 155 g of boric acid with stirring to a warm (75° C.) 1 liter solution, containing 40 g/l sodium hydroxystannate. The suspension was used to treat a bleached waste based liner paper (135 gsm) to impart the properties of fire retardancy.

The treatment was performed by immersing samples of the paper into the colloidal suspension which was maintained at a temperature of 65° C., for 2 seconds. Following immersion, the paper was blotted to remove excess surface material and then dried.

The fire retardant properties were assessed using cone calorimetry at an incident heat flux of 70 kW/m$^2$. Five sheets of paper (10 cm×10 cm) were layered together for each test measurement. Fire performance was evaluated using the following parameters.

(a) Time to ignition (seconds)

(b) Peak rate of heat release (kW/m$^2$)

(c) Fire performance index (m$^2$ seconds/kW)

Results of the cone calorimetric evaluation are presented in the following Table and are the average of three individual determinations.

| Treatment | Peak rate of heat release (kW/m$^2$) | Time to ignition (s) | Fire performance index (m$^2$skW$^{-1}$) |
|---|---|---|---|
| Untreated | 144 | 3 | 0.02 |
| Colloid treated | 36 | 38 | 1.06 |

What is claimed is:

1. A process for the fire retardant treatment of cellulosic materials, which comprises the steps of:
   (a)(i) impregnating the cellulosic material with an alkaline solution of an alkali metal stannate or stannite;
   (a)(ii) further impregnating the cellulosic material with an aqueous solution of boric acid; or
   (b) impregnating the cellulosic material with an aqueous colloidal solution produced by reacting an alkali metal stannate with boric acid, said colloidal solution having a pH in the range of from 4 to 8; and
   (c) allowing the impregnated material to dry.

2. A process as claimed in claim 1 wherein the cellulosic material is paper, card, cardboard or pulp.

3. A process as claimed in claim 1, wherein the process comprises steps (a)(i), (a)(ii) and (c) and wherein the alkaline solution of the alkali metal stannate or stannite used in step (a)(i) has a pH in the range of from 12 to 14.

4. A process as claimed in claim 3 wherein the alkaline solution of the alkali metal stannate or stannite has a pH in the range of from 13 to 13.5.

5. A process as claimed in claim 1, wherein the process comprises steps (b) and (c), and wherein the colloidal solution has a pH in the range of from 5 to 7.

6. A process as claimed in any one of the preceding claims wherein the cellulosic material is impregnated to give a final tin content, after drying, of from 0.4 to 12.0% by weight of tin based on the weight of the cellulosic material.

7. A process as claimed in claim 6 wherein the cellulosic material is impregnated to give a final tin content, after drying of from 1.0 to 5.0% by weight of tin based on the weight of cellulosic material.

8. A process as claimed in claim 6 wherein the cellulosic material is impregnated to give a final boron content, after drying, of from 0.4% to 8.0% by weight of boron based on the weight of the cellulosic material.

9. A process as claimed in claim 8 wherein the cellulosic material is impregnated to give a final boron content, after drying, of from 1.0% to 4.0% by weight of boron based on the weight of the cellulosic material.

10. Fire retardant cellulosic material produced by a process comprising the steps of
impregnating the cellulosic material with a fire retardant material consisting of (i) boric acid and and (ii) an alkali metal stannate or stannite.

11. Fire retardant cellulosic material as claimed in claim 10 which is paper, card or cardboard.

12. Fire retardant cellulosic material which comprises a cellulosic material and a fire retardant material, wherein said fire retardant material consists of from 0.4 to 12.0% by weight of tin based on the weight of the cellulosic material and from 0.4 to 8.0% by weight of boron based on the weight of the cellulosic material and wherein the fire retardant cellulosic material is formed by impregnating the cellulosic material with a fire retardant material consisting of (i) boric acid and (ii) an alkali metal stannate or stannite.

13. Fire retardant cellulosic material as claimed in claim 12 which consists of from 1.0 to 5.0% by weight of in based on the weight of the cellulosic material and from 1.0 to 4.0% by weight of boron based on the weight of the cellulosic material.

14. A process as claimed in claim 2, wherein the process comprises steps (a)(i), (a)(ii) and (c) and wherein the alkaline solution of the alkali metal stannate or stannite used in step (a)(i) has a pH in the range from 12 to 14.

15. A process as claimed in claim 14, wherein the alkaline solution of the alkali metal stannate or stannite has a pH in the range from 13 to 13.5.

16. A process as claimed in claim 14 or 15 wherein the cellulosic material is impregnated to give a final tin content, after drying, of from 0.4 to 12.0% by weight of tin based on the weight of the cellulosic material.

17. A process as claimed in claim 16 wherein the cellulosic material is impregnated to give a final tin content, after drying of from 1.0 to 5.0% by weight of tin based on the weight of the cellulosic material.

18. A process as claimed in claim 16 wherein the cellulosic material is impregnated to give a final boron content, after drying, of from 0.4 to 8.0% by weight of boron based on the weight of the cellulosic material.

* * * * *